United States Patent [19]

Ramallo et al.

[11] Patent Number: 4,665,099

[45] Date of Patent: May 12, 1987

[54] FAT SUPPRESSANT

[75] Inventors: Tomas A. Ramallo; Francisco M. Puchal; Juan C. Pinol; Enric Julia, all of Barcelona, Spain

[73] Assignee: Lucta S.A., Barcelona, Spain

[21] Appl. No.: 642,376

[22] Filed: Aug. 20, 1984

Related U.S. Application Data

[63] Continuation-in-part of Ser. No. 392,728, Jun. 28, 1982, abandoned.

[51] Int. Cl.$^4$ ............................................. A23K 1/00
[52] U.S. Cl. .......................................... 514/763; 426/2
[58] Field of Search ................. 426/2, 650, 651, 648; 424/355, 356, 78, 83; 514/763

[56] References Cited

U.S. PATENT DOCUMENTS

| | | | |
|---|---|---|---|
| 2,754,215 | 7/1956 | Evans et al. | 426/651 X |
| 2,921,853 | 1/1960 | Card et al. | 426/651 X |
| 3,120,442 | 2/1964 | Ostrus | 426/651 X |
| 3,328,168 | 6/1967 | Erwin | 424/355 |
| 3,404,011 | 10/1968 | Eolkin | 426/651 |
| 3,554,769 | 1/1971 | Caillouet | 426/651 X |
| 3,558,790 | 1/1971 | Marco | 424/356 |
| 3,660,562 | 5/1972 | Grass | 424/78 |
| 4,197,319 | 4/1980 | Betz et al. | 426/651 X |

*Primary Examiner*—R. B. Penland
*Attorney, Agent, or Firm*—Bernard Malina

[57] ABSTRACT

A composition is provided for suppressing formation of fat in animals comprising a blend of animal feed and polyterpenes of formula $(C_{10}H_{16})_n$, where n is an inter from 2 to 4. The polyterpenes may be generated in situ by the reaction of citrus essential oils with pharmaceutically acceptable acid or by direct synthesis. A method for suppressing body fat in both animals and humans is also disclosed comprising feeding or ingesting, respectively, polyterpenes prepared either by direct polymerization of neat terpenes or by the aforementioned in situ reaction.

9 Claims, No Drawings

FAT SUPPRESSANT

BACKGROUND OF THE INVENTION

This application is a continuation-in-part of copending Application Serial No. 392,728 filed on June 28, 1982, now abandoned.

FIELD OF THE INVENTION

This invention relates to a method and compositions for suppressing fat formation in animals and humans.

In the field of animal husbandry, it has long been considered desirable to produce edible animals with lower intracellular and intramuscular fat deposits without causing concomitant deleterious effects such as poor feed conversion or weight loss. Accordingly, much research has been carried out to develop lipolytic agents, i.e. materials that suppress fat formations in the animal.

Several patents report success in reducing the lipid content of the circulatory system. However, blood lipid suppressants reported therein were not shown to reduce body fat deposits. Moreover, these compounds exhibit toxicity at relatively low levels, thereby limiting their effective dosage.

Still other patents have claimed growth promotors. They increase the amount of meat produced per unit of feed stuff fed to an animal, above the standard food conversion rates. While growth promotors increase the amount of meat, they also increase fat.

An object of the invention is to provide a non-toxic composition useful in preventing fat formation in animals and humans.

It is a further object of the invention to provide an improved foodstuff or feed for animals which promotes growth without undesirable formation of fat.

It is another object of the invention to provide a method of raising animals with lower body fat content.

SUMMARY OF THE INVENTION

A fat suppressant composition is provided comprising:
(a) an animal feed; and
(b) from about 0.1 to 5%, by weight of feed, of polyterpene having the formula $(C_{10}H_{16})_n$, where n is an integer from 2 to 4.

Furthermore, a process is disclosed for the preparation of fat suppressant polyterpene having the formula $(C_{10}H_{16})_n$, where n is an integer from 2 to 4, comprising:
(i) blending together:
  (a) at least one citrus essential oil;
  (b) at least one pharmaceutically acceptable acid; and
  (c) an inert carrier; wherein the ratio of citrus essential oil to pharmaceutically acceptable acid ranges from about 1:10 to 10:1; and
(ii) storing the blend at about ambient temperature for at least three weeks until completion of reaction, as evidenced by the occurrence and subsidence of an exotherm.

A method is also provided for suppressing the formation of fat in animals or humans comprising feeding the animals or humans with a composition comprising polyterpenes having the formula $(C_{10}H_{16})_n$, where n is an integer from 2 to 4, in an amount effective to suppress fat formation.

DETAILED DESCRIPTION OF THE INVENTION

It has been found that polyterpenes of the formula $(C_{10}H_{16})_n$, where n is an integer from 2 to 4, are effective non-toxic agents for suppressing the formation of fat in animals and human beings, and as growth promoters.

Monoterpenes, from which the polyterpenes are prepared, are found abundantly in nature. Essential oils are a major source of monoterpenes. These oils include pine oil, citrus limonene, Japanese-mint oil, camphor oil, citronella, and lemongrass oils. Many of these essential oils are approved for human consumption. A majority of monoterpenes contained therein have GRAS status (i.e., generally recognized as safe). They can be used in both animal and human nutrition.

The diterpenes, triterpenes, quatriterpenes and mixtures thereof used herein as fat suppressants are obtained by polymerization of monoterpenes. Various catalytic agents have been identified in the literature as effective polymerization aids. Aluminum trichloride is mentioned as a catalyst in the Kirk-Othmer Encyclopedia, 2nd Edition, Vol. 19, p. 834. Also disclosed therein is the possibility of achieving these compounds by pyrolytic isomerization followed by polymerization. Isomerization is not limited to pyrolysis. An article by Verghese in P & E.O.R., 1967, p. 868, describes the rearrangement of p-menthadienes in the presence of Japanese acid clay, Floridin, silica gel, Florex-S and various acids.

Carter et al. report in the J. Soc. Chem. Ind. Trans., Vol. XLIV, p. 543, (1925), that diterpenes may be prepared from the reaction of different monoterpenes with phosphoric acid. Swann discloses in the J. Oil Color Chemist Assoc., 30, 163 (1947) that terpenes can be dimerized to diterpenes through various treatments including:
(a) strong mineral acids, such as sulphuric acid;
(b) metallic halides, such as zinc or aluminum chlorides;
(c) acid earth clays; and
(d) severe heat treatment.

The methods of Carter et al. and Swann describing polyterpene synthesis are herein incorporated by reference.

Polyterpenes need not, according to this invention, be derived from polymerization of isolated monoterpenes. In an alterative embodiment, citrus essential oils are mixed with one or more pharmaceutically acceptable acids, optionally in the presence of a carrier, and reacted to form in situ the polyterpene fat suppressants. Isolation of the active fat suppressant is not required.

Reaction between the citrus essential oils and acids will occur if the composition is allowed to stand at ambient temperature, about 60° F. to about 90° F., for a period of at least two months. An exothermic heat release provides indication that the reaction has begun and active fat suppressant polyterpenes formed.

Citrus essential oils useful herein include the essential oils from citrus fruits such as oranges, lemons, mandarins, tangerines, grapefruits, limes, satsumas, bergamotes, or any of their hybrids. These oils may be obtained from fruits by any methods known in the art including distillation, solvent extraction or cold pressing. These essential oils may be used neat, in form of solutions, or coated onto inert carrier materials.

Pharmaceutically acceptable acids which may be used to react with the essential oils are any acids known in the art, especially those on the GRAS list. These include acetic, citric, lactic, malic, phosphoric, succinic, and tartaric acids. Preferable are the acetic, citric and phosphoric acids.

Relative amounts of citrus essential oils to pharmaceutically acceptable acids range from about 1:10 to about 10:1.

Optionally, the citrus essential oil-pharmaceutically acceptable acid composition may also comprise at least one inert carrier. The inert carriers may be selected from the group consisting of solid carriers, such as silica gels, alkali and alkaline earth carbonates and sulphates, and solvents, such as propylene or ethylene glycol, ethanol, glycerol, and water. Where the solvent is water, a surface active agent will be required for emulsifying the polyterpene.

A wide variety of edible surface active agents may be employed. Especially preferred are the nonionics, examples of which are:

(i) polyoxyethylene derivatives of sorbitan mono-, di-, and tri-fatty acid esters wherein the fatty acid component has between 12 and 24 carbon atoms. The preferred polyoxyethylene derivatives are of sorbitan monolaurate, sorbitan trilaurate, sorbitan monopalmitate, sorbitan tripalmitate, sorbitan monostearate, sorbitan monoisostearate, sorbitan tristearate, sorbitan monooleate and sorbitan trioleate. The polyoxyethylene chains may contain between about 4 and 30 ethylene oxide units, preferably about 20. The sorbitan ester derivatives contain 1, 2 or 3 polyoxyethylene chains dependent upon whether they are mono-, di- or tri-acid esters.

Especially preferred commercial embodiments of this type of emulsifier are Polyoxyethylene 20 Sorbitan Trioleate, Polyoxyethylene 20 Sorbitan Monooleate, Polyoxyethylene 20 Sorbitan Tristearate, Polyoxyethylene 20 Sorbitan Monostearate, Polyoxyethylene 20 Sorbitan Monopalmitate and Polyoxyethylene 20 Sorbitan Monolaurate. These surfactants are available from ICI Americas, Inc., under the trademark "Tween 85", "Tween 80", "Tween 65", "Tween 60", "Tween 40" and "Tween 20", respectively. Alternatively, these same emulsifiers are available in Europe from Gattefoss, Ets under the trademark "Polysorbate".

(ii) polyoxyethylene derivatives of fatty alcohols wherein the fatty alcohol component has between 12 and 24 carbon atoms. The polyoxyethylene chains may contain between about 4 and 30 ethylene oxide units, preferably about 20.

(iii) polyoxyethylene derivatives of fatty acids wherein the fatty acid component has between 12 and 24 carbon atoms. The polyoxyethylene chains may contain between about 4 and 50 ethylene oxide units, preferably about 40.

(iv) polyoxyethylene-polyoxypropylene block polymers. These are derived from condensates of ethylene oxide with a hydrophobic base formed by condensing propylene oxide with propylene glycol. Commercial examples of this type of surfactant are the "Pluronics", a trademark of BASF-Wyandotte Corporation.

Carriers, either solid or liquid, may be present in amounts from about 10:1 to about 1:10 parts relative to the citrus essential oil—pharmaceutically acceptable acid mixture, all quantities being in parts by weight.

Fat suppressant compositions for animals are prepared by combining the polyterpenes of this invention with suitable animal feeds. Animal feeds can vary widely in their constituents. Nutrient availability in a particular geographical location is an important determinant. Even within the confines of the same farm, the necessary feed formula may vary dependent upon such items as the particular period in life and age of the livestock. Generally, animal feeds comprise cereal grains, usually supplemented with animal or vegetable protein concentrates which meet the total protein and essential aminoacid requirements of the animals. Cereal grains may include unmixed or mixed seed, whole or processed directly from the entie seed. Seed types include ground wheat, corn, cereal, grass, soybean meal, oats and similar grains, and mixtures thereof. Unground hay, straw, stover, silage, cobs, husks and hulls are also frequently included in the feeds. Inorganic supplements such as ground limestone, bonemeal, dicalcium phosphate, or salt are frequently included. Nutrient additives may also be combined in these compositions, examples of which may include the vitamins, riboflavin, niacin, pantothenic acids, choline, folic acid, and a variety of trace elements such as manganese, zinc and iodine. Among these supplemental aminoacids are included arginine, glycine, methionine, cystine, lysine, tryptophane, threonine, histidine, phenylalanine, tyrosine, leucine, isoleucine and valine. Antibiotics such as terramycin and aureomycin are usually included in the feed. Anti-spoilage agents such as butylated hydroxytoluene may also be found therein. Manufacturers of animal feeds include the Ralston Purina Company and the Cargill Corporation.

The fat suppressant agents described in this invention may be fed directly to animals or incorporated into an animal feed, the latter method being preferred. When incorporated into the feed, polyterpene will be present from about 0.1 to about 5% of the total animal feed composition. Preferably, the polyterpene concentration ranges from about 0.2% to about 2%. Dosage levels will vary depending upon the amount of actives within the polyterpene composition.

Polyterpene may be added to the animal feed in an edible liquid carrier or plaited onto an edible solid carrier. The ratio of polyterpene to carrier may range from about 1:10 to 10:1, preferably from 1:5 to 5:1. Suitable carriers include silica gel, alkali and alkaline earth metal carbonates and sulphates, and clays such as the bentonites. Liquid carriers for the polyterpene include any food grade solvents, such as ethylene glycol, propylene glycol, ethanol, glycerol, polyglyceride syrups, water and mixtures thereof. Surfactants must be blended along with the solvent when the latter is water to achieve a homogeneous dispersion. Nonionic surface active agents are particularly suitable, many of which have been described above.

In a further embodiment of this invention, a method is provided for raising meatier animals of normal weight, liver weight and liver color, but having lower body fat content. Fowl, cattle and pigs are typical of the animals within the scope of this invention. The fat suppressant method is particularly directed at chickens.

The method for suppressing body fat comprises the step of feeding the aforementioned animals with isolated polyterpenes or polyterpenes formed in situ from the reaction of citrus essential oils with pharmaceutically acceptable acids.

Humans may also benefit from ingesting polyterpenes. These polyterpenes can reduce body fat relative to the amount normally generated per weight food eaten.

The following examples will more fully illustrate the embodiments of this invention. However, these examples are not meant to limit the scope of the present invention which is defined by the appended claims. All parts, percentages and proportions referred to herein and in the appended claims are by weight unless otherwise specified.

EXAMPLE 1

Synthesis of Polyterpenes

A reactor equipped with reflux condenser and stirrer was charged with three kilograms of Florida orange essential oil and three kilograms of food grade phosphoric acid (80% purity). The reactants were heated to 120° C., with stirring, for a period of 8 hours. At the end of this period, two layers, one aqueous the other organic, were noted in the reactor. The layers were separated; then the organic layer was washed three times with an aqueous saturated sodium chloride solution. Organic and aqueous salt solution layers were separated. Infrared and mass spectral analysis of the washed organic layer indicated diterpene as a major constituent. A mass spectral parent peak at 272 molecular weight confirmed the diterpene structure. Various other polyterpene constituents were identified by gas liquid chromatography as being present in the organic layer extract.

EXAMPLE 2

A blend of polyterpenes obtained by the method described in Example 1 was absorbed onto silica aerogel, the ratio polyterpene to silica being 3:2. This composition was incorporated at 0.4% into the regular feed of broilers. These chickens, of the Arbor Acres strain, were kept in an experimental farm with 100% light and ventilation control. During the first week, light was kept on for 24 hours per day. Gradually, the light was intermittently turned off. Three weeks prior to slaughter, the light was on for only 12 hours per day. Regular commercial chicken feedstuff was supplied to the birds ad-libitum. During the experiment, feed intake, live weight and food conversion rate were all monitored. As soon as slaughter was completed, the following measurements were taken: abdominal fat pads, fat infiltration in liver, quality of skin and amount of pigmentation, both on skin and on tarsus. There were no noticeable differences in plumage quality or pigmentation level between the group fed polyterpene fat suppressant and the control animals. Results are described in Example 3 below.

In these experiments, it was established that fat pads produced in both control and experimental animals were more or less similar. However, the larger the bird, the more the improvement in percentage fat relative to the whole animal's weight.

EXAMPLE 3

In Experiment 2, the polyterpene mixture was supplied to the birds at a 0.4% concentration during the last 28 days of the birds' life. Experiment 3 illustrates the effect of feeding the Experiment 2 polyterpene mixture to the birds from their tenth day of existence onward. In a further variation, identified as Experiment 4, the same polyterpenes were given to the birds at a concentration of 0.5% per weight of feed. The latter dose covered the whole life of the bird. Results are recorded in Table I.

TABLE I

| Experiment | Carcass Weight (Kg) | Feed Conversion Rate | % Abdominal Fat Pads to Carcass Weight |
|---|---|---|---|
| Control | 2.133 | 2.265 | 3.01 |
| 2 | 2.105 | 2.230 | 3.03 |
| 3 | 2.186 | 2.191 | 2.78 |
| 4 | 2.213 | 2.131 | 2.52 |

From the data tabulated above, it can be concluded that the fat suppressant polyterpene mixture may be fed to the bird during its entire life. Furthermore, the fat suppressant increases in effectiveness when its presence is increased from 0.4 to 0.5% of feed.

EXAMPLE 4

Taste panels were used to determine differences in the meat of the chickens. Eight of the ten panelists found that the control chicken was fattier than that fed with the additive in Experiment 3. Seven out of ten panelists found that the Experiment 3 chickens were best in flavor and texture. Only three of the panelists preferred the chickens fed with the control feedstuff.

EXAMPLE 5

The following example illustrates the process for preparing polyterpenes by the in situ method. Fat suppressant effectiveness of these compositions is also detailed.

A polyterpene generating composition was prepared by blending together:

|  | Parts by Weight |
|---|---|
| lemon essential oil | 10 |
| orange essential oil | 15 |
| citric acid | 20 |
| silica aerogel | 55 |

After blending, the above composition was allowed to stand at ambient temperature for a period of 2-3 months. During that period of time, a reaction occurred evidenced by the exothermic generation of heat reaching temperatures of 150° F.

The aforementioned polyterpene composition was then mixed with various quantities of commercial broiler feed to provide feeds of varying polyterpene composition content. For instance, a feed containing 0.6% of the above polyterpene composition was prepared by blending 13.33 parts of polyterpene composition with 986.67 parts commercial feed.

Newborn chickens numbering 3,000 were divided into sets of 500. Each was fed the improved feed or control feed together with water, ad libitum, from the 10th to the 56th day, at which time they were slaughtered.

The following results were obtained:

TABLE II

| % Polyterpene Composition in Feed | 0 | 0.2 | 0.4 | 0.6 | 0.8 | 1.0 |
|---|---|---|---|---|---|---|
| average weight of the birds (kg) | 2.226 | 2.193 | 2.257 | 2.240 | 2.181 | 2.251 |
| feed conversion rate (1) | 2.088 | 2.091 | 2.045 | 2.105 | 2.140 | 2.080 |
| % fat pads (2) | 2.49 | 2.10 | 2.38 | 2.07 | 1.94 | 1.88 |
| % w/w liver to animal (3) | 2.30 | 2.28 | 2.25 | 2.37 | 2.52 | 2.50 |

TABLE II-continued

| % Polyterpene Composition in Feed | 0 | 0.2 | 0.4 | 0.6 | 0.8 | 1.0 |
|---|---|---|---|---|---|---|
| liver colour | 2.50 | 2.08 | 2.25 | 2.67 | 2.75 | 2.67 |

Footnotes:
(1) The feed conversion rate is defined as the amount of feed in parts by weight which must be consumed in order to yield one part by weight of living bird at the time of slaughter.
(2) The fat pads are defined as the fat clearly identifiable and not randomly deposited in the abdominal cavities of the animals. The % w fat pads is determined from the weights of the fat pads and the animal carcass.
(3) The % w/w liver/animal is calcuated as follows:

$$\% \text{ w/w liver/animal} = \frac{\text{weight of liver}}{\text{weight of animal}} \times 100$$

Thus, it is seen that while the average weight of the broilers and their feed conversion rate and liver color remained normal, the weight of liver/weight of animal increased while the fat content (measured by the %fat pds) decreased with increasing dosage of the polyterpene composition.

EXAMPLE 6

In a taste test, nineteen persons consumed two half chickens—one half from the control set and the other half from the chickens which were fed the feed containing 0.8% polyterpene composition of Example 5. The following results were obtained:

| | Number of Persons - Opinions | |
|---|---|---|
| | Meat Fattier | Preferred |
| Control | 16 | 7 |
| Treated | 3 | 12 |

Thus, it was seen that the treated birds were found to contain less fat and therefore also preferred for eating.

EXAMPLE 7

A polyterpene generating composition was prepared by blending together:

| | Parts by Weight |
|---|---|
| orange essential oil | 20 |
| lime essential oil | 5 |
| phosphoric acid | 30 |
| silica gel | 45 |

The above blend was stored at 65°–100° F. for an 8 week period. An exotherm was noted during this storage period. Commercial broiler feed was combined with the aged blend to provide an improved treated feed containing 0.6% of polyterpene composition (i.e. orange-lime essential oils and phosphoric acid).

800 broilers were divided into two sets of 400 birds each. One set was fed the control and the other set the 0.6% polyterpene treated feed. The following results were obtained:

TABLE III

| | Control | Treated Feed |
|---|---|---|
| average grams of weight gained from day 31 to day 56 | 1492 | 1478 |
| average grams of feed consumption days 31 to 56 | 3354 | 3337 |
| feed conversion rate from day 31 to day 56 (1) | 2.007 | 2.015 |
| % of abdominal fat pads in carcass (2) | 2.67 | 2.20 |

Footnotes:
(1) The feed conversion rate is defined as the amount of feed in parts by weight which must be consumed in order to yield one part by weight of living bird at the time of slaughter.
(2) The fat pads are defined as the fat clearly identifiable and not randomly deposited in the abdominal cavities of the animals. The % w fat pads is determined from the weights of the fat pads and the animal carcass.

It will be seen that whereas the average weight gain, feed consumption and feed conversion rate were constant, the abdominal fat content of the birds fed on treated feed was about 18% less than those fed untreated feed.

EXAMPLE 8

Example 5 was repeated except that the polyterpene generating composition was varied as follows:

| Experiment No. | Oil (parts by weight) | Acid (parts by weight) | Carrier (parts by weight) | Surface Active Agent (parts by weight) |
|---|---|---|---|---|
| 1 | tangerine (30) | citric (30) | solid (40) | — |
| 2 | orange (25) | phosphoric (25) | solid (50) | — |
| 3 | grapefruit (20) | acetic (10) | water (65) | Tween TM 80 (5) |
| 4 | mandarin (40) | malic (20) | ethyl alcohol (40) | |

EXAMPLE 9

Example 5 was repeated with similar storage conditions except that the compositions now comprised mixtures of

| | Parts by Weight |
|---|---|
| Experiment 1 | |
| orange oil | 25 |
| silica aerogel | 75 |
| or | |
| Experiment 2 | |
| phosphoric acid | 25 |
| silica aerogel | 75 |

Each of the above compositions were used at the 0.4% level based on total feed weight. These were fed to a set of broilers. No fat suppressing results were obtained.

While preferred embodiments of the invention have been described herein, it is obvious that additions, changes and omissions may be made in such embodiments without departing from the spirit and scope of the invention.

What is claimed is:

1. A process for the preparation of fat suppressant polyterpenes having the formula $(C_{10}H_{16})_n$, where n is an integer from 2 to 4, comprising:
(i) blending together
  (a) at least one citrus essential oil; and
  (b) at lest one pharmaceutically acceptable acid; and
  (c) an inert carrier, wherein the ratio of essential oil to pharmaceutically acceptable acid ranges from about 1:10 to 10:1; and (ii) storing the blend at about ambient temperature for at least two months until completion of an exothermic reaction.

2. A process according to claim 1 wherein an inert carrier is present in an amount from about 10:1 to about 1:10 relative to the citrus essential oil-pharmaceutcally acceptable acid mixture.

3. A method for suppressing the formation of fat in humans comprising ingesting a composition comprising polyterpenes of the formula $(C_{10}H_{16})_n$, where n is an integer from 2 to 4 present in an amount effective to suppress the formation of body fat deposits.

4. A method for suppressing the formation of fat and promoting growth in animals comprising feeding the animals with a composition comprising polyterpenes having the formula $(C_{10}L_{16})_n$, where n is an integer from 2 to 4, in an amount effective to suppress the formation of body deposits.

5. A method according to claim 4 wherein the polyterpenes are formed in situ or from the reaction of at least one citrus essential oil with at least one pharmaceutically acceptable acid, the amount of oil to acid ranging from about 1:10 to 10:1.

6. A method according to claim 19 wherein the polyterpenes are formed in the presence of an edible inert carrier.

7. A method according to claim 4 wherein the animals are chickens.

8. A method according to claim 4 wherein the animals are fowl.

9. A method for promoting growth in animals comprising feeding the animals with a composition comprising polyterpenes having the formula $(C_{10}H_{16})_n$, where n is an integer from 2 to 4, in an amount effective to suppress the formation of body fat deposits.

* * * * *